US00RE36661E

United States Patent [19]

Tanaka et al.

[11] E Patent Number: Re. 36,661

[45] Reissued Date of Patent: Apr. 18, 2000

[54] INFLATABLE SEAT BELT WITH LEAK DETECTION DEVICE

[75] Inventors: Yoshihiko Tanaka, Tokyo; Tsuneo Chikaraishi; Muneharu Tomie, both of Hikone, all of Japan

[73] Assignee: Takata Corporation, Tokyo, Japan

[21] Appl. No.: 08/970,778

[22] Filed: Nov. 14, 1997

Related U.S. Patent Documents

Reissue of:

[64] Patent No.: 5,466,002
Issued: Nov. 14, 1995
Appl. No.: 08/269,364
Filed: Jun. 30, 1994

[51] Int. Cl.[7] ..... B60R 21/18

[52] U.S. Cl. ..... 280/733; 280/735

[58] Field of Search ..... 280/733, 728.3, 280/730.1, 730.2, 728.1, 729, 735, 736, 740, 741, 743.1

[56] References Cited

U.S. PATENT DOCUMENTS

| | | | |
|---|---|---|---|
| 3,682,498 | 8/1972 | Rutzki | 280/733 |
| 3,720,445 | 3/1973 | Bennett | 297/488 |
| 3,801,156 | 4/1974 | Granig | 280/733 |
| 3,820,842 | 6/1974 | Stephenson | 280/733 |
| 3,830,519 | 8/1974 | Lewis | 280/733 |
| 3,841,654 | 10/1974 | Lewis | 280/733 |
| 3,848,887 | 11/1974 | Fox | 280/733 |
| 3,865,398 | 2/1975 | Woll | 280/733 |
| 3,866,940 | 2/1975 | Lewis | 280/733 |
| 3,874,694 | 4/1975 | Stephenson | 280/733 |
| 3,888,503 | 6/1975 | Hamilton | 280/733 |
| 3,905,615 | 9/1975 | Schulman | 280/733 |
| 3,933,370 | 1/1976 | Abe et al. | 280/733 |
| 3,970,329 | 7/1976 | Lewis | 280/733 |
| 5,213,363 | 5/1993 | Fukumori et al. | 280/743.1 |
| 5,288,104 | 2/1994 | Chen | 280/733 |
| 5,303,953 | 4/1994 | Kamiyama et al. | 280/733 |
| 5,346,250 | 9/1994 | Kamiyama | 280/733 |
| 5,356,176 | 10/1994 | Wells | 280/736 |
| 5,385,367 | 1/1995 | Tanaka et al. | 280/733 |
| 5,390,953 | 2/1995 | Tanaka et al. | 280/733 |
| 5,464,246 | 11/1995 | Castro et al. | 280/730.2 |
| 5,465,999 | 11/1995 | Tanaka et al. | 280/733 |
| 5,466,003 | 11/1995 | Tanaka et al. | 280/733 |
| 5,480,181 | 1/1996 | Bark et al. | 280/730.2 |

FOREIGN PATENT DOCUMENTS

| | | | |
|---|---|---|---|
| 42 32 041 | 4/1993 | Germany | 280/733 |
| 50-67520 | 6/1975 | Japan . | |
| 64-83436 | 3/1989 | Japan | 280/733 |
| 6-56001 | 3/1994 | Japan . | |
| 6-144138 | 5/1994 | Japan | 280/733 |
| 6-262994 | 9/1994 | Japan | 280/733 |
| 6-262995 | 9/1994 | Japan | 280/733 |

OTHER PUBLICATIONS

"The Standard Handbook of Textiles", Hall, A. J., pp. 184–185, undated.

*Primary Examiner*—Peter C. English
*Attorney, Agent, or Firm*—Foley & Lardner

[57] ABSTRACT

An inflatable seat belt apparatus is formed of an inflatable portion which is usually maintained in a band shape and has an envelope shaped elastic inflatable member inflated and deployed in a rough spindle shape by introducing gas generated by a first gas generating device. The gas generating device operates in case of exceeding a predetermined threshold. A webbing includes the inflatable portion and extends over at least a range directly contacting with an occupant. A tongue is fixed to an end of the inflatable portion and includes a gas path extending from the gas generating device. A buckle is detachably engaged with the tongue. The envelope shaped inflatable member is inflated in a predetermined shape by introducing gas for a leak testing from a second gas generating device when the tongue is engaged with the buckle, and is inspected whether or not the gas leaks by a gas leak detecting device disposed in the gas path. A state of the damage is inspected.

19 Claims, 9 Drawing Sheets

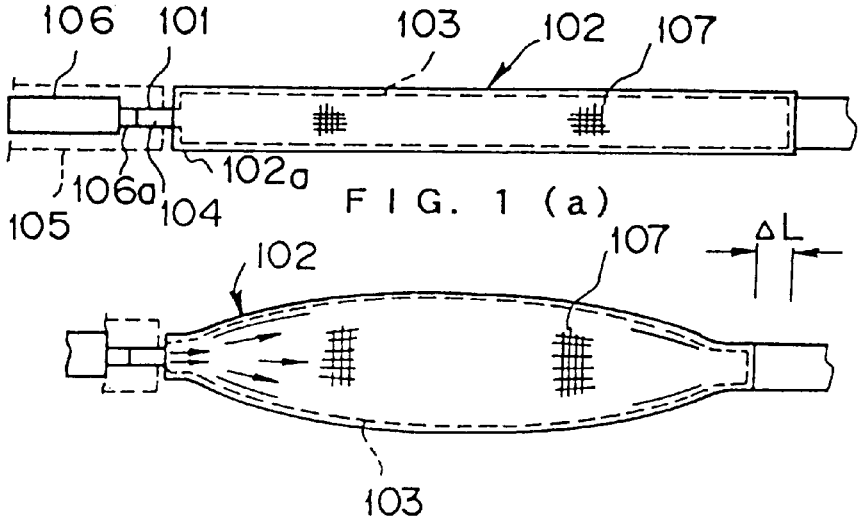
FIG. 1 (a)
FIG. 1 (b)
PRIOR ART
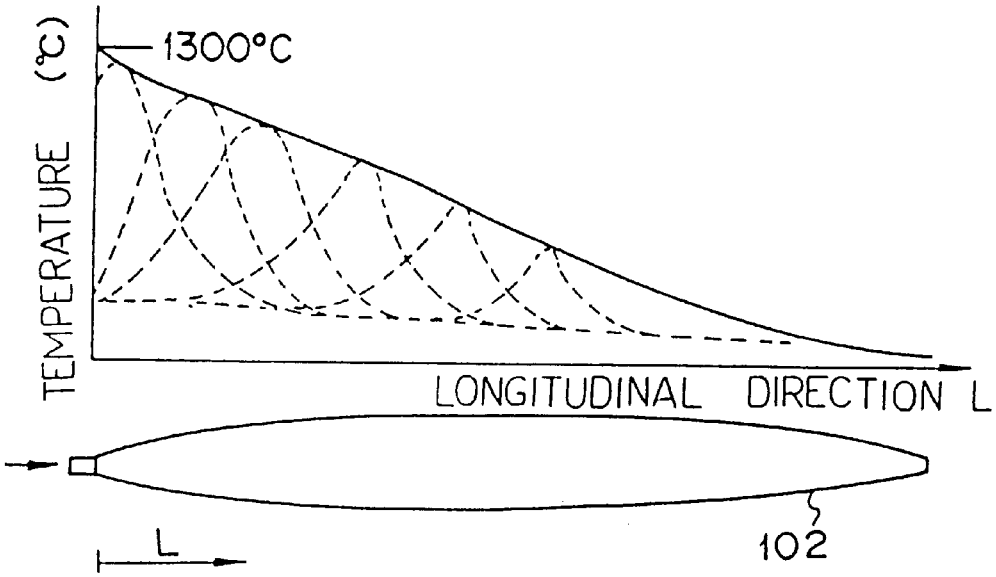
FIG. 2
PRIOR ART

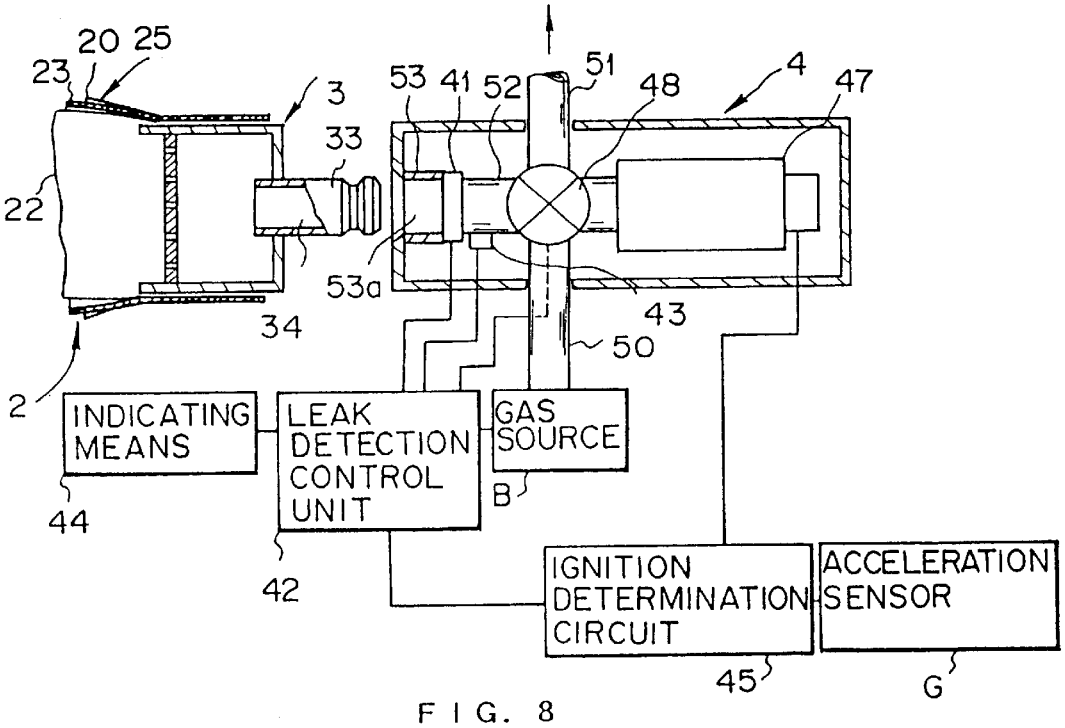
F I G. 8
(AMENDED)

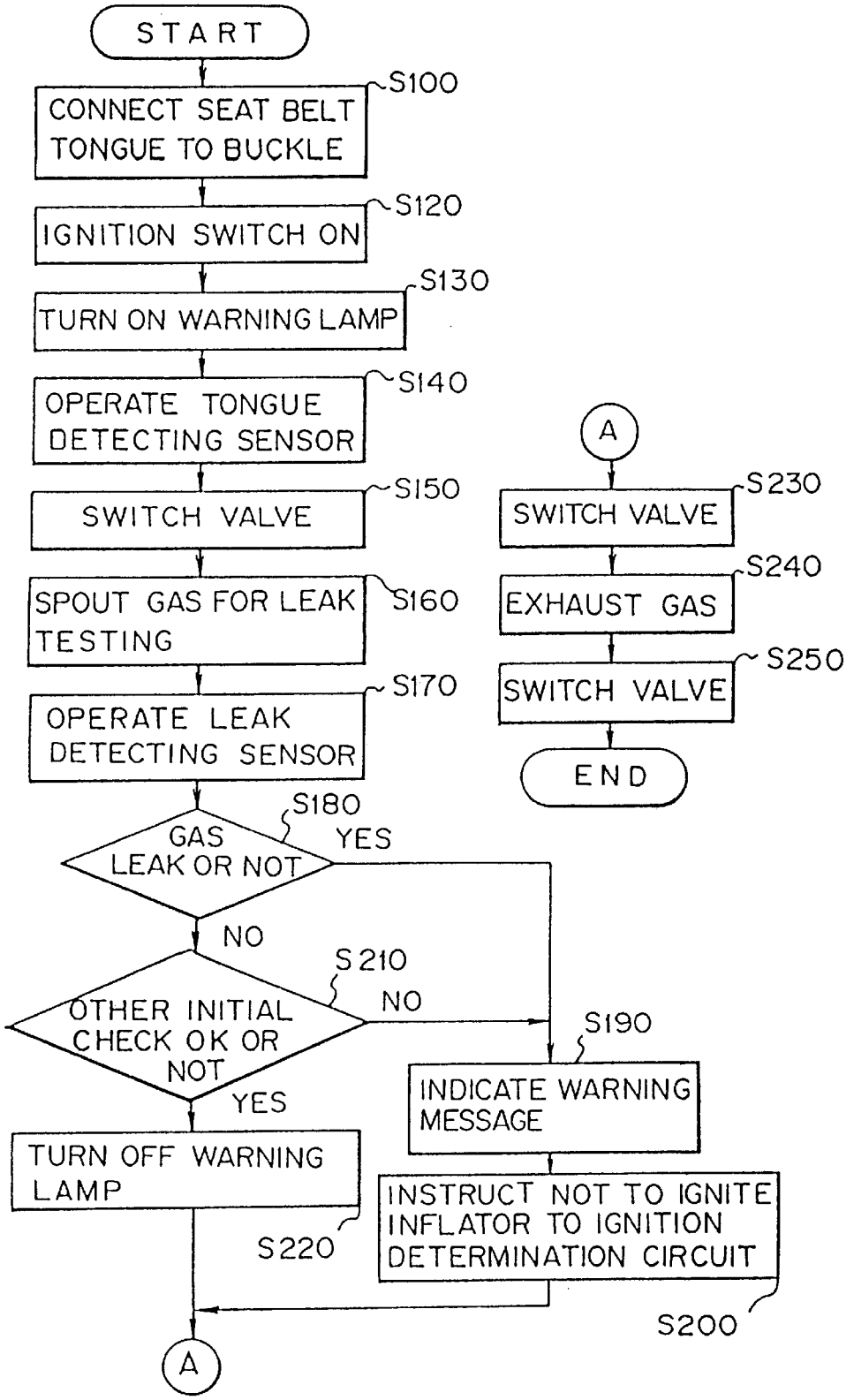
FIG. 10
(AMENDED)

INFLATABLE SEAT BELT WITH LEAK DETECTION DEVICE

Matter enclosed in heavy brackets [ ] appears in the original patent but forms no part of this reissue specification; matter printed in italics indicates the additions made by reissue.

BACKGROUND OF THE INVENTION

The present invention relates to an inflatable seat belt apparatus, more particularly to an inflatable seat belt, wherein a webbing of a seat belt apparatus to restrain an occupant has an inflatable portion formed in an envelope shape which is usually maintained in a band shape and is inflated in a predetermined shape by high temperature gas spouted from gas generating means at a crash. In the invention, the inflatable seat belt can be inspected automatically whenever the occupant wears the seat belt as to whether or not the inflatable portion is damaged.

Presently, a seat belt apparatus is necessary for a vehicle or the like as an apparatus for securing an occupant's body, which restrains the occupant from sudden movement by an deceleration and an impact occurred at a crash.

Such a seat belt apparatus comprises a normal webbing ("a webbing" is used hereinafter as a woven belt made of a normal fabric which has approximately a 50 mm width and is provided by Japanese Industrial Standard in this specification), a retractor (hereinafter, ELR: Emergency Locking Retractor is denoted instead of the retractor), a buckle, a tongue, an anchor and so on. The ELR winds the webbing by a spring force and locks the webbing from withdrawing only at a crash so as to restrain the occupant. The buckle is mounted to a suitable position so that the webbing fits the occupant's body well.

Conventionally, the seat belt apparatus locks the webbing from withdrawing by the function of ELR at a crash to restrain the occupant from forward movement.

For improvement in the efficiency of restraining the occupant, each of U.S. Pat. Nos. [3,841,645] *3,841,654*, 3,865,398, and 3,866,940 discloses a seat belt apparatus in which the webbing has a portion formed in an envelope shape made of a fabric. The webbing is folded like *a* bellows and then provided with weak adhesive so as to usually [maintain] *remain* in a band shape, or the folded portion is maintained in the band shape by fastening means such as a fastener, so that at a crash, the portion formed in an envelope shape is inflated and deployed by spouted gas from a gas generator connected to the webbing.

According to the seat belt apparatus having the inflatable portion formed in an envelope shape (hereinafter, called "an inflatable seat belt apparatus"), the force applied to the occupant can be distributed over the range wider than the conventional webbing so as to decrease the stress applied to the occupant and a higher safety efficiency can be provided.

The inflatable seat belt apparatus can be effective even for a rear seat. For mounting an air bag apparatus for an occupant on the rear seat, the air bag apparatus is generally mounted on the rear side of the back portion of the front seat. It is necessary that the front seat structure has a high rigidity for suitably operating the air bag apparatus for the rear seat to efficiently restrain and secure the occupant. Therefore, it is difficult to have the reclining function to the front seat if the air bag apparatus is mounted on the rear side of the back portion of the front seat. Therefore, the inflatable seat belt apparatus is quite effective for the rear seat because the inflatable seat belt apparatus can be independently mounted on the rear seat and has no restriction such as the air bag apparatus.

In the inflatable seat belt apparatus mentioned above, the gas generator operates according to an operation signal from a sensing unit such as an acceleration sensor sensing an impact at a crash and the enveloped shaped inflatable portion is then substantially instantaneously inflated and deployed in a predetermined form.

Recently, most [of the] gas [generator] *generators* (hereinafter, called "[inflator] *inflators*") [is a device for] *are devices that* instantaneously [generating] *generate* gas by use of a rapid combustion of *a* filled up compound.

The inflator receives, first, the operational signal from the acceleration sensor at a crash to act as a trigger for the electrical squib. An ignitor is actuated by the electrical squib to burn a propellant so as to rapidly generate gas.

The propellant may be sodium azide ($NaN_3$) which is well known as a propellant and generates nitrogen gas by combustion.

In case of the conventional inflatable seat belt apparatus in which the thick fabric is folded, the inside of the fabric is coated with silicone rubber to provide higher airtightness for the envelope shaped portion and the inflator is provided with a simple filter for cooling an inside thereof to lower the temperature of the introduction gas so that the high temperature gas from the inflator is directly introduced into the envelope shaped portion.

[The applicant has already disclosed an invention of the] *Disclosed in commonly-owned Japanese patent applications are* inflatable seat belt apparatus in which the envelope shaped portion is formed from a knitted textile and has an inflatable unit having a rubber tube inside thereof. [Furthermore, the applicant has already disclosed an invention of the] *Further disclosed in commonly-owned Japanese patent applications are* inflatable seat belt apparatus in which the envelope shaped portion is formed from a fabric having wefts which expand enough and has an inflatable unit of rubber tube inside thereof. (*See* Japanese Patent Application No. 210353/1992, *publication No. 6-144138, published May 24, 1994; Japanese Patent Application* No. 210355/1992, *publication No. 6-56001, published Mar. 1, 1994; Japanese Application* No. 78623/1993, *publication No. 6-262994, published Sep. 20, 1994; Japanese Patent Application* No. 78624/1993, *publication No. 6-262995, published Sep. 20, 1994*).

According to the above mentioned inventions, when the occupant usually wears the inflatable seat belt apparatus, the envelope shaped portion is maintained in a thin band shape as compared with the conventional inflatable seat belt apparatus in which the thick fabric is folded. Furthermore, in an emergency, the envelope shaped portion can be quickly inflated and deployed without fail.

FIG. 1(a) illustrates an example of the inflatable seat belt apparatus in which a shoulder belt having a pipe portion is formed of a knitted textile and has an inflatable unit of rubber tube inside thereof.

In this figure, numeral 101 designates a tongue. The tongue 101 has a gas inlet 104 as an inlet for introducing the gas into a rubber tube 103 arranged in the belt 102. The gas inlet 104 is coupled to a gas outlet 106a of gas generating means (inflator) 106 situated inside a buckle 105 when the tongue 101 is engaged with the buckle 105 for fixing a belt end 102a to the vehicle body.

FIG. 1(b) exemplifies a state of a belt 102 inflated and deployed in a predetermined shape. The propellant in the inflator 106 is burned to generate reaction gas, and the gas is introduced into the rubber tube 103 of the belt 102 through the gas inlet 104, so that the belt 102 is inflated and deployed in the predetermined shape.

As the gas is rapidly introduced into the rubber tube 103, the rubber tube is inflated as shown in the FIG. 1 (b), wherein the shape of the whole inflatable portion is controlled by a knitted textile structure 107 formed in an envelope shape which covers the rubber tube 103. Therefore, the inflatable portion becomes a spindle shape. Because the area of the belt portion touching the chest and the like of the occupant is increased, an impact applied to the occupant is softened.

Because the inflatable portion formed in an envelope shape is radially increased, the length of the belt in a longitudinal direction is shortened by ΔL. Therefore, the inflatable seat belt apparatus has a function as a pretensioner by which the occupant is more effectively ensured.

In the inflatable seat belt apparatus of this kind, the gas spouted from the inflator is introduced into the tube with a high temperature and high pressure condition.

FIG. 2 is a temperature distribution diagram exemplifying a result of measuring the temperature distribution within the tube at this stage. The figure also shows the inflatable portion in [a] *an* inflated condition below the diagram to indicate the relative position.

At this stage, the inside of the tube has a highest temperature at a tongue portion near the gas inlet as shown in FIG. 2. The highest temperature tends to be approximately 1,300° C. At each point in the tube in the longitudinal direction L, respective temperatures appear with introduction of the gas as shown by the dotted lines. The solid line shows a curve tracing the respective temperatures at each point.

The gas generated by the combustion in the inflator is quite high temperature. However, because the temperature drops along the longitudinal direction, the tube works efficiently if only it can withstand the high temperature for a very short period.

A silicone rubber of a heat resistance has been adapted to the tube for receiving the high temperature gas to withstand the high temperature in the tube.

However, in the above mentioned inflatable seat belt apparatus, it is thought that the tube is damaged for some reason.

Even if the tube is damaged, the inflatable seat belt apparatus can work as a normal seat belt apparatus because the webbing extends over the whole seat belt. However, in [case of inflating] *the event that* the belt portion [by introducing the] *is inflated with* reaction gas [by acting] *from* the inflator, the gas [is flown] *flows* out of the tube [form] *from* the damaged portion of the tube, so that the function of the inflatable seat belt apparatus may not effectively work. Therefore, it is preferable that the inflatable[.] seat belt apparatus can be inspected whether or not the inflatable portion such as the tube is damaged.

In this case, the driver brings a gas leak detector in the vehicle and introduces gas for detecting a gas leak into the inflatable portion by using the tongue as an inlet to detect the gas leak. This work is too heavy *a* burden for the driver's every day check up, so that the driver tends not to do it.

SUMMARY OF THE INVENTION

It is therefore an object of the present invention to solve the above mentioned conventional problems and to provide an inflatable seat belt apparatus which can automatically inspect a gas leak by using a gas path in the buckle [during wearing the seat belt] *while the seat belt is worn.*

For the above mentioned object, this invention provides an inflatable seat belt apparatus comprising an inflatable portion which is usually maintained in a band shape and has an envelope shaped elastic inflatable part inflated and deployed in a rough spindle shape by introducing gas generated by first gas generating means, the gas generating means acting in case of exceeding a predetermined threshold, a webbing having the inflatable portion extending over at least a range directly contacting with an occupant, a tongue fixed to an end of the inflatable portion and having a gas path from the gas generating means at an inside thereof, and a buckle to which the tongue is detachably engaged, wherein the inflatable portion is inflated in a predetermined shape by introducing a gas for a leak testing from second gas generating means when the tongue is engaged with the buckle, and is inspected whether or not the gas leaks by gas leak detecting means disposed in the gas path to thereby inspect a state of the damage. Therefore, as the tongue mounted on the end of the inflatable portion is engaged to the buckle, the gas for testing a gas leak is introduced into the envelope shaped elastic inflatable member to be inflated in the predetermined cylindrical shape. In the state that the elastic inflatable member is inflated, the gas leak detecting means mounted in the gas path detects whether or not the gas leaks to inspect the damage state. Therefore, the inflatable seat belt can be inspected automatically whenever the occupant wears the seat belt as to whether or not the inflatable portion is damaged, e.g. the envelope shaped elastic inflatable member has a hole or the like.

In this event, preferably, the first gas generating means does not act when the gas leak detecting means detects that the envelope shaped elastic inflatable part [has] *is* damaged even in *a* case of exceeding a predetermined threshold. This prevents the gas from spouting [form] *from* the damaged portion such that the reaction gas having a high temperature is introduced into the envelope shaped elastic inflatable member at a crash without [knowing] *detection.*

Furthermore, preferably, the detection result of the gas leak detecting means is indicated to indicating means disposed on a predetermined position in front of the occupant in the vehicle. Therefore, the occupant can know the condition of the inflatable seat belt before driving.

BRIEF DESCRIPTION OF THE DRAWINGS

FIG. 1 (a) and FIG. 1 (b) are explanatory drawings showing conditions that a conventional inflatable seat belt apparatus having an inflatable portion formed from a knitted textile structure is inflated and not inflated;

FIG. 2 is a simplified temperature distribution diagram showing a distribution of gas temperature in the inflatable portion of the inflatable seat belt apparatus as shown in FIG. 1 (b);

FIG. 8 is a simplified structural view showing a relation between the control member for the leak testing and a structure of the buckle in use for the present invention;

FIG. 10 is a flow chart showing each step of a leak testing of the rubber tube in the inflatable portion of the inflatable seat belt apparatus according to the present invention;

DETAILED DESCRIPTION OF THE PREFERRED EMBODIMENTS

An embodiment of an inflatable seat belt apparatus according to the present invention is now described referring to the attached drawings.

Figure 3:
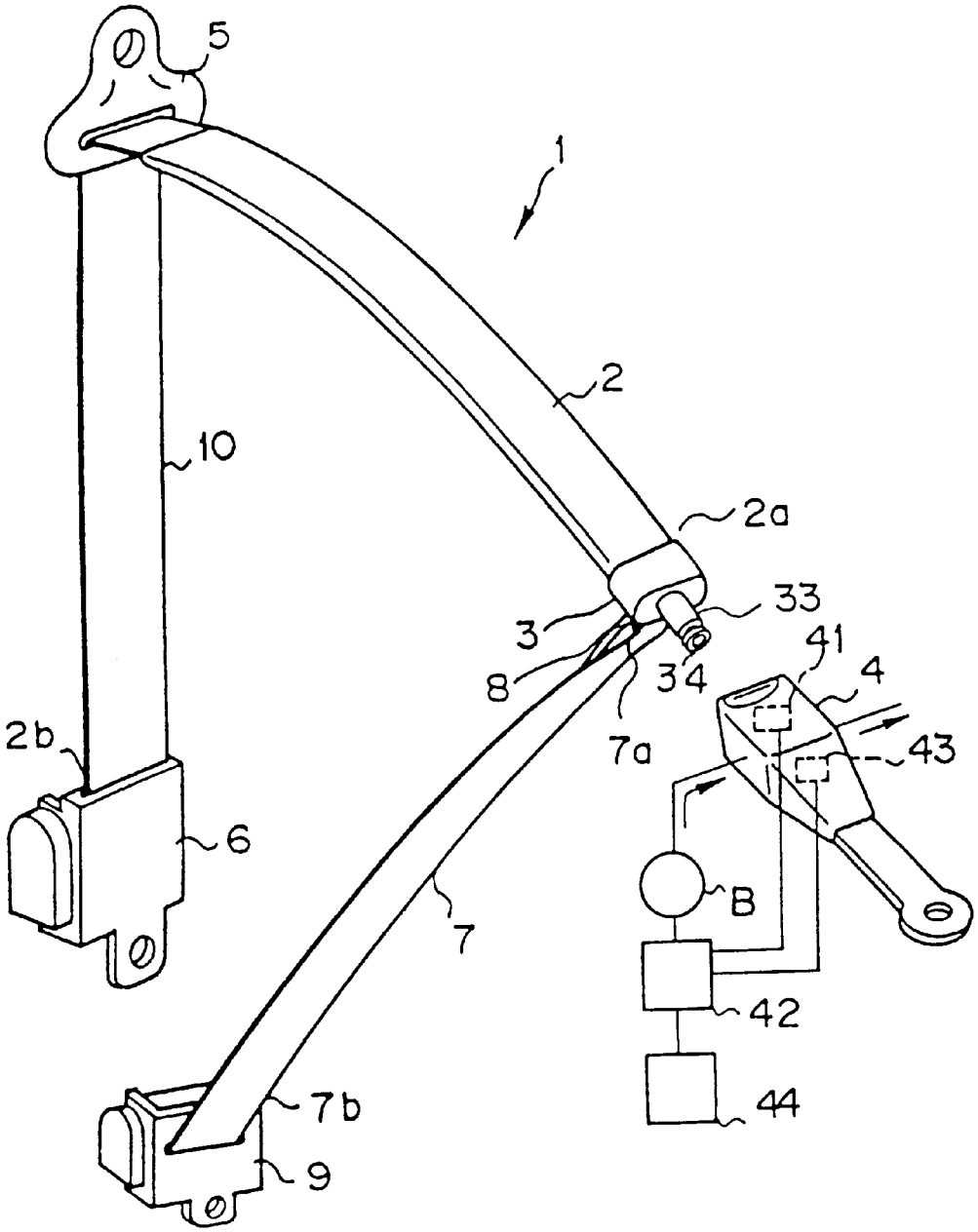
FIG. 3 is a simplified structural drawing showing an inflatable seat belt apparatus of an embodiment according to the present invention.

FIG. 3 is a simplified perspective view showing a whole structure of the inflatable seat belt apparatus 1. This figure illustrates [for clarifying] relationships between respective components of the inflatable seat belt apparatus applied to the front seat.

In this figure, numeral 2 designates a shoulder belt. The shoulder belt 2 has an end 2a to which a tongue 3 is fixed. The shoulder belt 2 is engaged and fixed to a buckle 4 mounted to a predetermined position near the floor between the right and left front seats via the tongue 3. That is, the tongue 3 has a tongue pipe 33 having a gas inlet at an inside thereof and attached at an end of the tongue 3. The tongue pipe 33 is inserted and fixed into a connection hole of the buckle body (not shown) of the buckle 4 to fix the belt end.

The shoulder belt 2 has the other end 2b downwardly guided through a slip guide 5 of a pillar anchor mounted on a pillar (center pillar, not shown). The pillar anchor is adjustable in upper and lower directions. The shoulder belt is thus hung around and from the slip guide 5 to be wound up in an ELR 6 arranged near the floor on the pillar.

A lap belt 7 has an end *7a* fixed to an anchor plate 8 fixed to a mouthpiece of the tongue 3 and has the other end *7b* wound in the ELR 9 mounted near the floor at the door side beyond the seat cushion.

[The description will now be made as regard to components] *Components* for carrying out a leak testing of an inflatable structural portion (the structure of this member will be described later) formed at a portion of the shoulder belt 2 during wearing, and the components [are] mounted in the buckle 4 *will now be described.*

A tongue connection detecting sensor 41 is mounted near the connecting hole disposed on the inside of the buckle 4. The tongue connection detecting sensor 41 detects that the tongue pipe 33 is inserted and fixed into the connection hole. A leak detecting control unit 42 is disposed on the outside of the buckle 4. The leak detecting control unit 42 receives a detecting signal [form] *from* the tongue connection detecting sensor 41. The leak detecting control unit 42 controls opening and closing motions and a passing direction of a valve (not shown) disposed between a gas source B and the tongue pipe 33 and outputs a command signal to the valve operation unit. Indicating means 44 is disposed on an instrument panel. The indicating means 44 indicates a predetermined warning message by detecting a signal of leakage from the leak detecting control unit 42.

Figure 4:
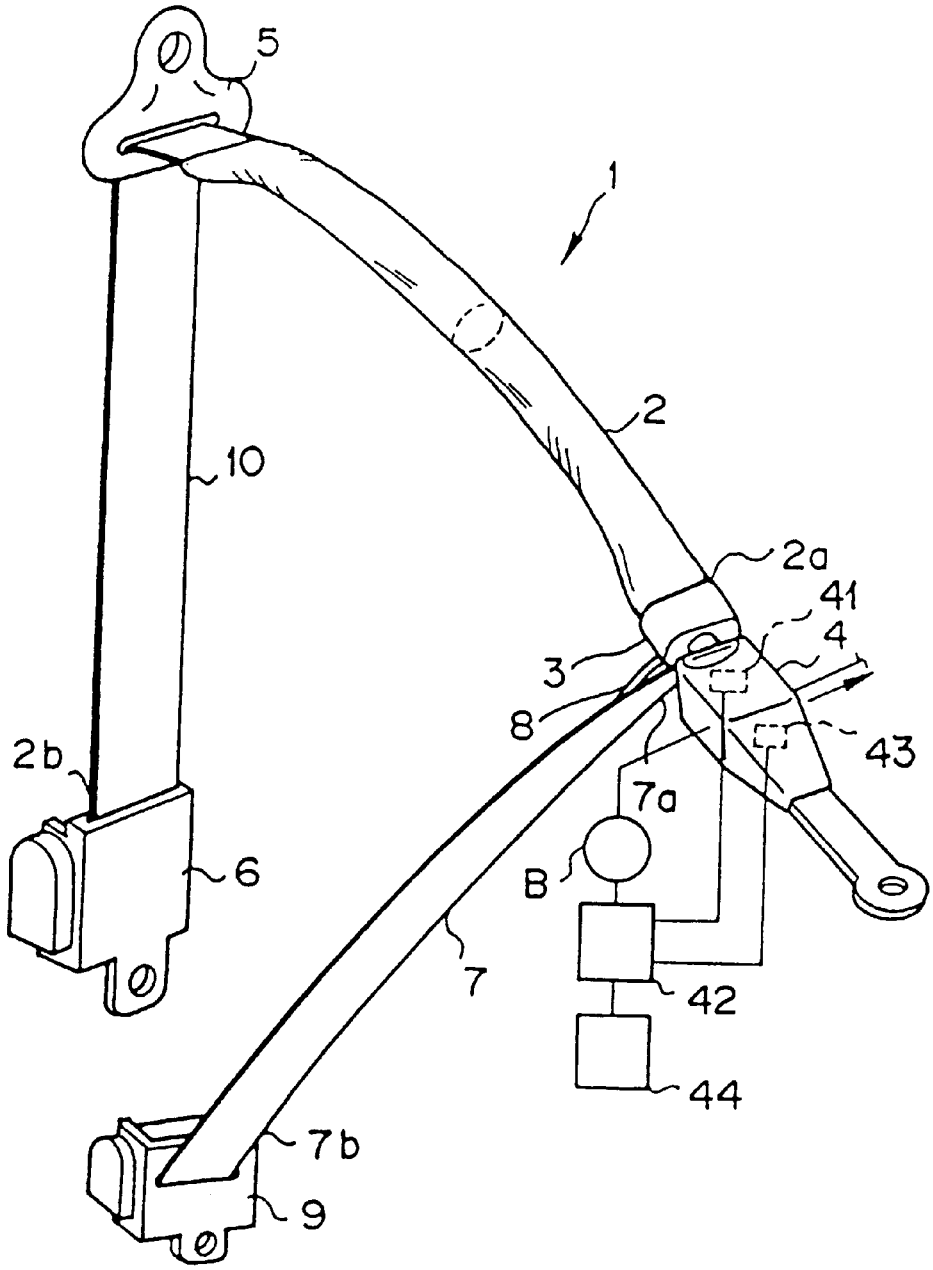
FIG. 4 is a simplified structural drawing showing a state that the inflatable seat belt apparatus is fixed to the buckle and a leak testing is carried out.

FIG. 4 shows a state [that] *in which* the tongue 3 of the shoulder belt 2 is inserted and fixed into the connection hole of the buckle 4 and the seat belt apparatus is worn.

In this condition, as the occupant turns an ignition switch in an ACC or ON state, gas in use for leak testing is introduced from the gas source B into the inflatable portion of the shoulder belt 2 through a gas path 34 of the tongue pipe 33 and the inflatable portion is inflated in a cylindrical shape having a small diameter as shown in the drawing. The gas is stopped in the state that the inflatable portion is inflated and a pressure in the inflatable portion is maintained so as to test for a gas leak. A leak detecting sensor 43 mounted in the buckle 4 detects the gas leak from the tube. In case of [the] *a* gas leak, the leak detecting sensor 43 outputs the predetermined warning message into the indicating means 44.

[The description will now be made as regard to details] *Details* of each [member] *component* of the inflatable portion attached to the shoulder belt [referring] *will now be described in reference* to FIG. 5 and FIG. 6.

The shoulder belt 2 comprises the end 2b wound and accommodated in the ELR 6, the other end 2a connected to the tongue 3, and a piece of webbing 10 as a through member as shown in FIG. 1. In this embodiment, for the webbing 10, a band shaped belt having a 50 mm width and a 1.6 mm thickness in which polyester finished yarns are tightly woven by twilling, plain weaving or the like is employed. The webbing 10 is equivalent to one of a normal seat belt apparatus. The webbing 10 has a section between an abdominal region and a right shoulder region which directly touches the body of an occupant wherein the section has a portion covered by a cylindrical cover 20 made of a cloth and is slightly thick.

In the inside of the thick portion, several kinds of envelope shaped members are accommodated overlappingly.

Figure 5:
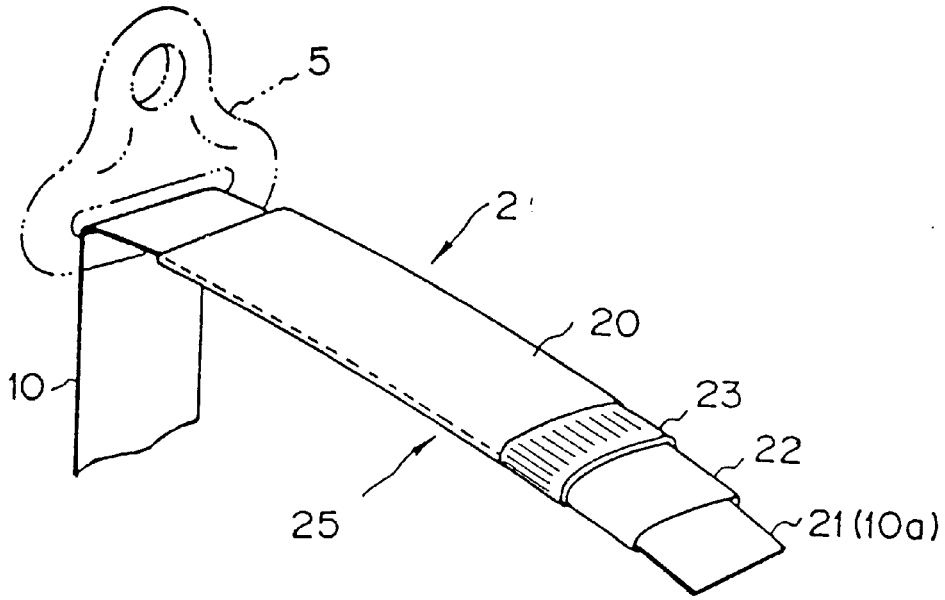
FIG. 5 is a perspective partial section view magnifying and exemplifying the inside of the inflatable portion when an occupant usually wears the inflatable seat belt apparatus shown in FIG. 3.

In FIG. 5, numeral 10a shows a condition that the webbing 10 is positioned within the cover 20. Because of the difference of the functions, this portion of the belt is called an inner belt 21, the portion of the belt which is exposed outside and is wound into the ELR 6 is called the webbing 10, and these portions are designated by the different numerals 10 and 21, respectively.

Figure 13:
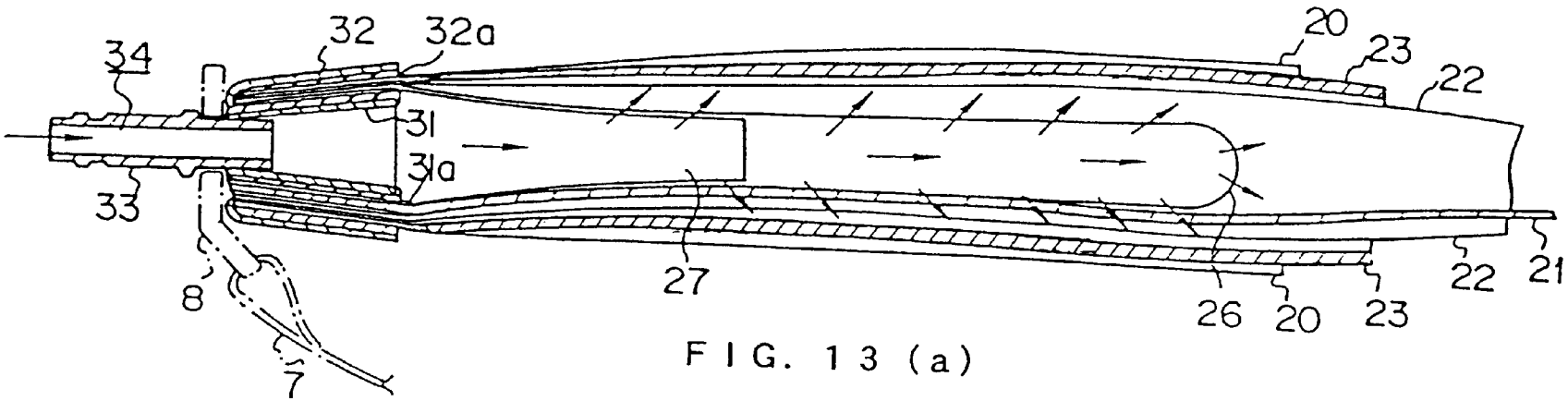
Figure 13:
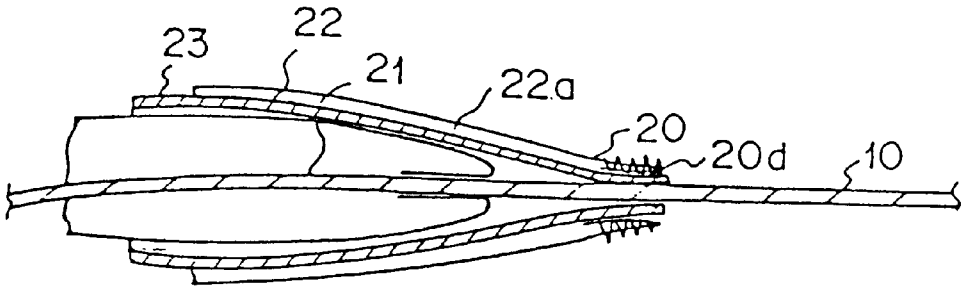

The inner belt 21 is inserted in a flat condition into a tube 22 formed of a thin film and made of silicone rubber as shown in FIG. 13 (b). The tube 22 made of silicone rubber is cylindrical and has an end 22a fixed to a predetermined position of the inner belt 21 to maintain the airtightness as shown in FIG. 13 (b). Therefore, the tube 22 is inflated in a long and slender cylindrical shape as gas is introduced into the tube 22.

This tube 22 is accommodated in a cylindrical knitted textile member 23 of a flat type which is knitted in a size slightly larger than the tube 22. In this embodiment, the knitted textile member 23 is constituted by a tubular knitted textile using a polyester finished yarn (1500 denier). The knitted textile member 23 of the tubular knitted textile has a characteristic *by* which *it* does not elongate in the longitudinal direction of the belt (warp direction of the knitted fabric) and is easy to elongate in a direction (weft direction of the knitted fabric) *such* that the circumference of the cylindrical shape is increased. *Thus, upon inflation, the knitted fabric expands in a direction transverse to the longitudinal direction of the webbing 10 to pretension the webbing 10, for example, in a manner similar to that illustrated in FIGS. 1(a) and 1(b).*

The cloth cover 20 as described above is arranged to wholly cover the knitted textile member 23 of a cylindrical shape, and the knitted textile member 23 and the cover 20 are firmly sewn together with the inner belt 21 as shown in FIG. 13 (b).

Preferably, a material for the cover 20 does not show [crease] *creases* in the belt and is soft to the touch because the cover 20 is a portion directly touched with the hand of the occupant and directly contacts with the [clothe] *clothing* of the occupant. In this embodiment, a tricot knit fabric knitted by warp knitting with a polyester finished yarn is employed for the cover 20.

The thick portion has the inflatable tube 22 and the inner belt 21 as a core, and the end connected to the gas generator via the tongue 3 so as to be inflated and deployed by the gas introduced in a very short period of time at a crash. Therefore, the inflatable seat belt apparatus can efficiently restrain the occupant from movement. In this specification, "inflatable portion" will be denoted instead of a whole set of the inflatable member hereinafter.

In addition to the embodiment described above, this invention may be accomplished by following embodiments having modified components of the inflatable portion.

For the tube 22, a rubber material is suitable for [using] *use*. The rubber material has high elasticity even against a rapid inflation and has heat-resistance because the high temperature gas is filled in the inside of the tube 22. The material having a rubber-like elasticity is used for the tube 22. The material may be, for example, various kinds of thermoplastic elastomer, urethane rubber, fluorocarbon rubber, blended rubber or the like.

The knitted textile member 23 is constituted by [the] *a* tubular knitted textile of weft knitting having no seam for forming a cylindrical shape in the above mentioned embodiment. The stitch may be plain stitch, rib stitch, pearl stitch, interlock stitch or the like. In this case, the elongation of the knitted textile member 23 in the weft direction is changeable by converting density or course of weft knitted loops into the warp direction.

The knitted fabric of a flat type is made by plain weave. In this case, it is possible that [2] *two* sheets of the knitted fabrics in a long and slender shape are overlapped and the ends of the knitted fabrics are sewn together to make a cylindrical form, and that both ends of one sheet of the knitted fabric are sewn together to make a circular form.

A cloth employed for the cover 20 may be a plain weave fabric using a nylon yarn or polyester yarn.

Besides the materials as described above[embodiments], other material such as a resin film, an artificial leather or the like is considered to be employed for the cover if the material satisfies the conditions of the feel, the stiffness, the persistence and so on.

Figure 6:
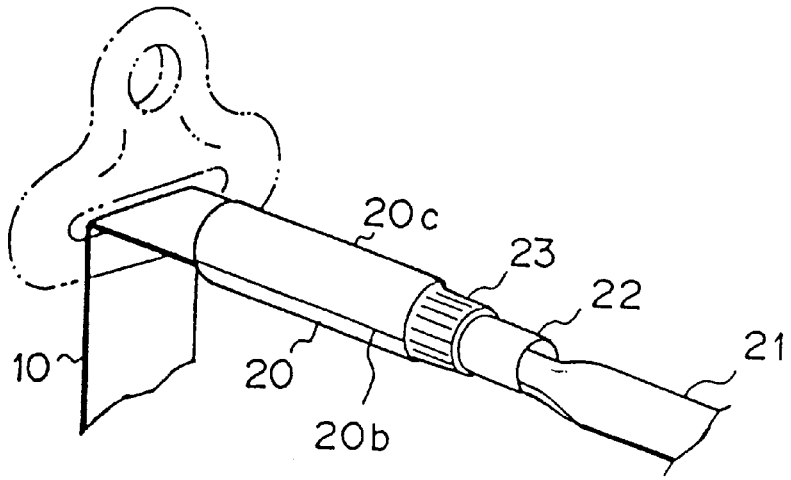
FIG. 6 is a perspective partial section view exemplifying the inside of the inflatable portion of the inflatable seat belt apparatus shown in FIG. 3 when the leak testing is carried out.

FIG. 6 is a perspective partial exploded view [for understanding] *illustrating* the inside of the inflatable structural portion shown in FIG. 5 when the leak testing is carried out.

As shown in this figure, the tube 22 is inflated by the introduced gas. At this stage, a volume of the spouted gas is reduced to a necessary volume for a leak test so that the seam 20b of the cover 20 is not broken even if the pressure in the tube 22 is applied. Therefore, the whole inflatable portion is inflated only in a long and slender cylindrical form (a diameter of the cylindrical form is approximately 3.6 cm in this embodiment).

Figure 7:
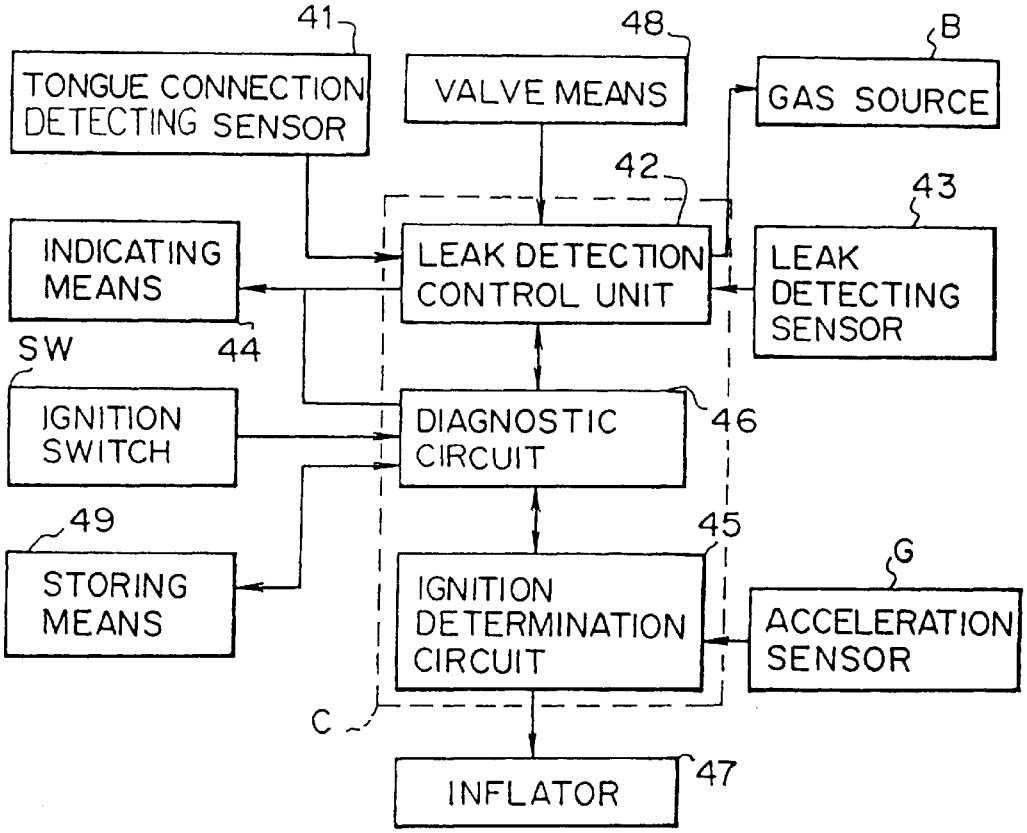
FIG. 7 is a simplified block diagram showing a relation between a control member and each sensor of the inflatable seat belt apparatus according to the present invention.

[The description will now be made as regard to a] *A* relation among a control unit for igniting the ignitor of the inflatable seat belt apparatus, and each sensor and a control unit for carrying out the leak testing during wearing [referring] *will now be described in reference* to FIG. 7.

In this figure, a portion enclosed by the dotted line C is the control unit. The control unit C comprises the leak detecting control unit 42, an ignition determination circuit 45 and a diagnostic circuit 46.

The leak detecting control unit 42 is connected to the tongue connection detecting sensor 41 for detecting that the tongue 3 is reliably fixed to the buckle 4 during wearing, the gas source B for introducing the gas into the silicone rubber tube 22 for forming the inflatable structure portion 25 through the tongue 3, the leak detecting sensor 43 for detecting whether or not the gas leaks and the indicating means 44 comprising a warning lamp for indicating a result of the leak detecting.

The ignition determination circuit 45 calculates an acceleration wave form or the like outputted from acceleration sensors G mounted to a plurality of portions of the vehicle, determines whether or not the inflator 47 is ignited, or detects an ignition timing, and provides an operate instruction signal or a non-operate instruction signal to the inflator 47.

The diagnostic circuit 46 observes an abnormality of the whole control circuit of the inflatable seat belt apparatus, [nitrifies] *identifies* an abnormal portion and the detail to the occupant by the warning light or the like, and stores the detail into the storing means 49 such as *an* EEPROM.

When the occupant fixes the tongue of the seat belt to the buckle and turns the ignition switch in ACC or ON position, [an] *a* starting signal for the leak testing outputs, so that the acceleration sensor G outputs an initial check and dummy signal into the ignition determination circuit 45.

FIG. 8 is a simplified structural view showing the relation among a structure of the buckle 4 and control blocks for the leak testing within the control unit C.

The tongue pipe 33 of the tongue 3 fixedly mounted to the end of the shoulder belt 2 is inserted into the connection hole 53a of the buckle body 53 of the buckle 4 and is engaged to a lock mechanism which functions by one action to fixedly connect to the buckle 4.

At this event, the gas path 34 is formed in the tongue pipe 33. As the tongue pipe 33 is connected to the connection hole 53a in the buckle body 53, the gas path 52 connected to the inflator 47 accommodated in the buckle 4 communicates with the tongue pipe 3. A valve 48 for switching the flow of the gas is mounted to a predetermined position of the gas path 52. Further, the valve 48 is connected to a gas supply pipe 50 extending from the gas source B and connected to a gas exhaust pipe 51 for exhausting the gas outside.

The valve 48 can switch the flow of the gas by the operational signal from the leak detection control unit 42 as [follow] *follows*.

The inflator 47→the tongue pipe 33 of the seat belt (introducing the gas for inflation and deployment at a crash).

The gas source B→the tongue pipe 33 of the seat belt (introducing the gas for leak testing).

Shutting state (during gas leak testing).

The tongue pipe 33 of the seat belt→the gas exhaust pipe 51 (exhausting the gas after leak testing).

The tongue connection detecting sensor 41 is mounted to the end portion of the buckle body 53 to be contacted to the distal end of the tongue pipe 33 when the tongue pipe 33 is inserted. The tongue connection detecting sensor 41 detects that the tongue is reliably connected to the buckle.

The leak detecting sensor 43 is disposed between the tongue connection detecting sensor 41 and the valve 48 in the gas path 52. A detecting unit of the leak detecting sensor 43 faces the inner surface of the gas path 52. For the leak detecting sensor 43, an electronic pressure sensor is employed in this embodiment, so that the electronic pressure sensor can detect an infinitesimal pressure fluctuation. A sensor using a semiconductor strain gage of silicone diaphragm type may be employed for the leak detecting sensor 43.

A small compressed air or carbon dioxide cylinder may be mounted as the gas source B. It is possible that a part of the exhaust gas is introduced to pass through the filter to remove combustion cinder so that the exhaust gas is filled in the cylinder by a compressor or the like. When using the exhaust gas, the cylinder does not need to be exchanged and the gas exhaust pipe 51 is connected to an exhaust pipe of the engine to return the exhaust gas to the exhaust pipe.

Figure 9:
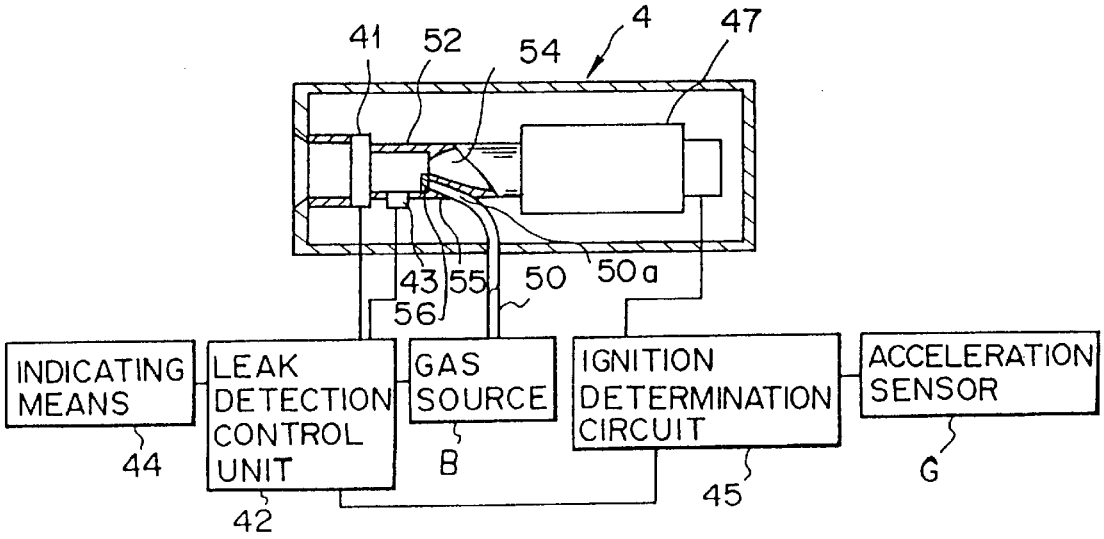
FIG. 9 is a simplified structural view showing an altered example of a buckle and control member according to the present invention.

FIG. 9 shows an altered example, wherein the valve 48 is removed from the structure as shown in FIG. 8.

In this figure, an orifice member 54 is formed inside the gas path 52 not to restrict the gas from flowing from the inflator. The gas flow path 50a for the leak testing is disposed in the orifice member 54 and faces toward the tongue 3. The gas flow path 50a is communicating to the gas supply pipe 50 disposed outside the gas path 52 and can introduce the gas for leak testing from the gas source B into the gas path 52. A check valve 56 is disposed on an outlet *55* of the gas flow path 50a to restrict the gas flow from reversing to the gas source. The other members are the same as the buckle 4 as shown in FIG. 8.

Preferably, the gas filled in the tube is exhausted through a small vent hole disposed to the end opposite to the tongue, instead of the valve.

[The description will now be made as regard to the] *The* operational state for the leak testing of the rubber tube accommodated in the inflatable portion [according to a] *will now be described in reference to the* flow chart as shown in FIG. 10.

[The] *An* occupant sits [into] *in* the vehicle and connects the tongue 3 of the seat belt apparatus to the buckle 4 mounted near the floor of the vehicle (Step 100), and turns the ignition switch SW in ACC or ON position, and then the diagnostic circuit 46 starts an initial check (Step 120). At this stage, a warning lamp of an instrument panel in front of the driver is turned on to indicate the leak testing and the beginning of the initial check (Step 130). At the same time, the tongue connection detecting sensor 41 mounted to the buckle body 53 is operated (Step 140), and then the valve 48 is switched to communicate the gas supply pipe 50 extending from the gas source B with the gas path 52 at the tongue side (Step 150).

Therefore, the gas for leak testing is introduced into the rubber tube 22 through the tongue 3 (Step 160). In this state, the valve 48 is shut and the leak detecting sensor operates to detect whether or not the gas filled up in the rubber tube leaks (Step 170). As the leak detecting sensor detects a gas leak, the predetermined warning message is indicated to a liquid-crystal indicating unit of the instrument panel and the warning lamp continues to light (Steps 180,190). The non-operate instruction signal to the inflator is then outputted to the ignition determination circuit 45 so that the inflator does not work even if an ignition instruction signal is outputted from the sensor (Step 200).

When an abnormality is found by the other initial check (*Step 210*), the portion and the detail of the abnormality are indicated to the warning message so that the inflator does not work (Steps 190, 200). On the other hand, when a gas leak is not found and the other initial check is normal, the warning lamp of the instrument panel is turned off to indicate the termination of the leak test and the initial check (Step 220).

The valve is then switched to communicate the gas path 52 at the tongue side with the gas exhaust pipe 51 to exhaust the gas filled in the rubber tube (Steps 230,240), and then switched to communicate the gas path [52] (*Step 250*) at the inflator side with the gas path 52 at the tongue side.

Though the rubber tube is inflated by the supply gas from the gas source B in the leak testing mentioned above, the leak test may be accomplished by that the rubber tube is sucked by a pump.

In addition, the gas may not be exhausted even after the leak testing, and the shoulder belt formed in a cylindrical shape by the gas filled in the rubber tube may be formed in an arch shape to fit the occupant's body and spaced from the shoulder and the chest of the occupant so that the seat belt may be used as a comfortable device.

Figure 11:
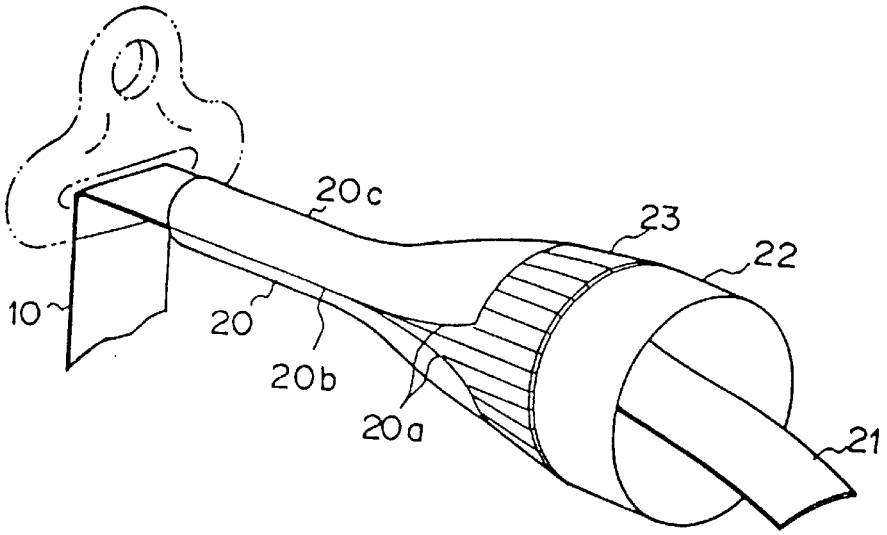
FIG. 11 is *a* perspective partial view exemplifying the inside of the inflatable portion when the inflatable seat belt apparatus shown in FIG. 5 is inflated and deployed.
Figure 12:
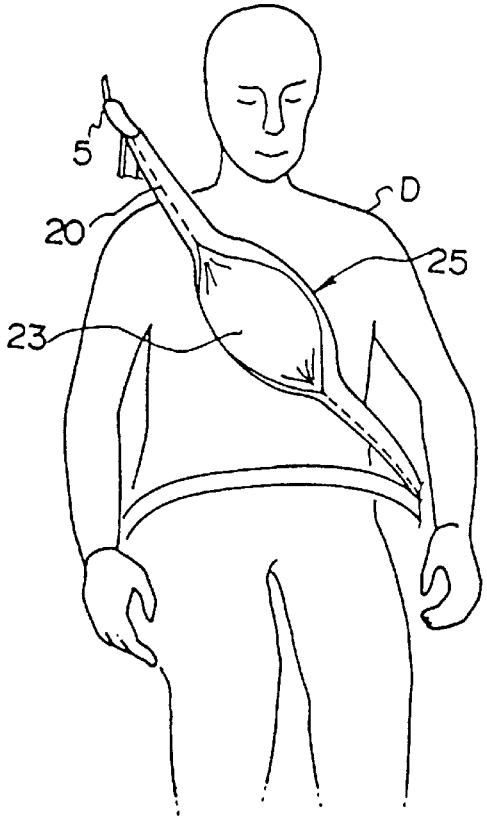
FIG. 12 is a perspective view [simply] showing a result of tests [that] *in which* the inflatable seat belt apparatus of the present invention is [wore] *applied* to a dummy and is inflated and deployed; and, FIG. 13 (a) and FIG. 13 (b) are longitudinal sectional views showing an inner structure of an example of the inflatable portion of the inflatable seat belt apparatus according to the present invention.

Referring to FIG. 11 and FIG. 12, the description will now be made as regard to the operation for inflation and deployment and the shape of the inflatable portion at a crash.

FIG. 11 is a perspective view showing the inside of the inflatable portion when the inflatable seat belt apparatus shown in FIG. 5 is inflated and deployed.

As shown in this figure, as the tube 22 is inflated by the introduced gas generated by the inflator, the knitted textile member 23 of tubular knitting elongates in the weft direction and inflates in the cylindrical shape. When the predetermined inner pressure is applied, a portion of the thread sewing together the cloths of the cover 20 is torn. A seam 20a of the cover is then opened like a mouth, and the tube 22 covered by the knitted textile member 23 is inflated in a spindle shape to be forced out from the opening of the seam 20a.

While, because a seam 20b of the cover 20 is sewn firmly at a predetermined range near the pillar anchor of the inflatable portion 25 and at a predetermined range near the tongue 3, the inflation of the tube 22 is limited by a cover portion 20c of the cover 20, so that the cover portion 20c is inflated only in a long and slender cylindrical form.

The length in the longitudinal direction of the belt is shortened because the inflatable portion 25 is inflated in a spindle shape. At this point, because the knitted textile member 23 of the inflatable portion 25 receives a tensile force in the longitudinal direction of the belt, the inner belt 21 does not receive the tensile force so that the inner belt 21 is loose.

FIG. 12 is a perspective view [simply] showing a result of tests [that] *in which* the inflatable seat belt apparatus of the present invention is applied to a dummy D and is inflated and deployed.

According to the inflatable seat belt apparatus attaching the cover 20 which is sewn and controlled by strength of the seam, the inflatable portion 25 is inflated around the chest of the dummy D. At the chest of the dummy D, the inflatable seat belt has an area 1.6 times wider than the area of the normal webbing 10 of the seat belt apparatus. Therefore, the inflatable seat belt can protect the occupant reliably and softly.

At this event, it should be understood that the position and the range of the tearing portion of the cover 20 are set freely by changing the portion of seaming of the cover 20.

As apparent [form] *from* FIG. 12, the inflatable portion 25 inflates in a long and slender cylindrical shape to cover the portion other than the chest. Therefore, the inflatable seat belt can protect the occupant reliably and softly as compared with the normal webbing even at the ranges from the collarbone to the shoulder and from the abdomen to the hip.

The inflatable range of the inflatable portion 25 can be controlled by adjusting the strength for seaming the cover. Therefore, the suitable inflation shape and the reduction of the inflatable volume are accomplished.

Though the description is made as regard to the seaming by the thread for joining the cover in the above description, an adhesive strength may be altered by changing the adhesive surface if the joint is provided by adhesion, or a joint strength is controlled by a mechanical joining member and the same effect can be provided.

Referring to FIG. 13 (a) and FIG. 13 (b), [the description will now be made as regard to] details of the fitting structure between the inflatable portion 25 and the tongue 3 provided with the gas inlet, and to a structure of a bag filter *will now be described.*

FIG. 13 (a) is a longitudinal sectional view showing an arrangement of the inflatable portion fixed to the tongue 3. An end [25a] of the inflatable portion 25 is fixed to cover an end fitting 31 made of metal which has a flat square section. Furthermore, the end [25a] *of the inflatable portion* is fixed firmly by a caulking fitting 32 so as to cover the periphery thereof so that the inflatable portion 25 is not easily broken away from the end fitting 31.

The end fitting 31 has a tongue pipe 33 secured to the distal end thereof. The tongue pipe 33 enters and engages to the buckle body of the buckle 4[(not shown)]. The tongue pipe 33 has the gas path 34 formed inside thereof. The gas from an inflator (not shown) is introduced into the inflatable portion 25 through the gas path 34 and the inside of the end fitting 31.

The tongue 3 of this embodiment is integrally structured by a combination of the end fitting 31, the caulking fitting 32, and the tongue pipe 33.

The tongue pipe 33 has a lap belt anchor plate 8 fixed to the bottom part thereof to secure an end 7a of a lap belt 7 constituted of a normal webbing.

As shown in this figure, each member (the inner belt 21, the bag filter 26, the tube 22, the knitted textile member 23, the cover 20) of the inflatable portion 25 is overlapped to the peripheral portion of the end fitting 31 coated by a rubber coating 31a to tightly touch with each other. The caulking fitting 32 having an inside coated by a rubber coating 32a is fixed to the peripheral portion of the inflatable portion.

Since the inflatable portion 25 is structured as described above, the inflatable portion 25 is maintained [sealingly] *to form a seal* at the end [25a] thereof and a break off or a breakage of the end fitting 31 is not possible even if the reaction gas having high pressure is rapidly introduced into the inflatable portion 25.

The structure of the bag filter 26 will be described now in detail.

The bag filter 26 is a filter formed of a fabric having high air permeability which is sewn in an envelope form, and which has substantially the same width as the width of the inner belt 21 and is choked at a distal end side thereof. The bag filter 26 is inserted into the tube 22 and has an end fixed to the tongue 3. Furthermore, a skirt 27 is inserted into the bag filter and has a length which is one third of the length of the bag filter 26. The skirt 27 is cylindrical to have an opening at a distal end thereof and is formed of the same fabric as the bag filter in this embodiment.

The bag filter 26 and skirt 27 are made from heat-resistant fiber in this embodiment. For example, the heat-resistant fiber may be aramid fiber. The aramid fiber is well known as a trade mark Kevlar® fiber and has high stiffness and high elasticity. Further, the aramid fiber has good heat resistance and good flametightness and starts carbonizing at approximately 500° C., so that the aramid fiber does not self-melt and self burn even at a high temperature.

Though the Kevlar® fiber employed in this embodiment is para-bond aramid fiber, meter-bond aramid fiber may, of course, be employed in view of its heat resistance. Furthermore, the filter may be formed of not only textile fabric but also non-woven fabric.

The bag filter 26 is inflated with the gas spouted from the inflator and is capable of collecting the cinder having predetermined or bigger sizes to the inside thereof because of its air permeability. The tube is then inflated with the gas passed through the bag filter 26. At this stage, as the gas temperature is lowered, the bag filter effectively acts as a filter and a diffuser.

The skirt 27 is overlapped around the tongue to effectively display its heat resistance with reference to the temperature distribution as shown in FIG. 2.

The bag filter 26 may be *a* single [by the] fabric having different thicknesses at the tongue side and at the end thereof, respectively, or [providing] *may have* a metal coating *applied* to the inside of the bag filter 26 at the tongue side.

Though the aramid fiber is employed in this embodiment as described above, the fiber may be carbon fiber, silicon-carbide fiber or glass fiber each of which has high heat resistance.

The carbon fiber has an extremely high heat resistance because it is made by burning and carbonizing organic fiber. Therefore, the heat resistance of the carbon fiber is expected to withstand approximately 2000° C. if the carbon fiber is employed as a diffuser which receives no load as described in the present invention.

The alumina fiber as an oxide inorganic material has also very high heat resistance and is convenient as a textile.

FIG. 13 (b) is a sectional view showing a treatment structure of an end between the inflatable portion 25 and the webbing 10, i.e. the inner belt 21, near a slip guide side.

As the structure is now [be] described again, the end of the knitted textile member 23 of tubular knitting is integrally glued to the end 20d of the cover 20 by the adhesive and is firmly sewn to the webbing 10. The end 22a of the tube 22 made of silicone rubber is heat-sealed or glued to the inner belt 21 within the knitted textile member 23 inside of the sewing part. The end of bag filter 26 described above extends inside the tube 22.

In FIG. 13 (b), the inner belt in the tube 22 may be cut at the end 22a. Only the cylindrical bag filter 26 having the same functions as described above is accommodated in the tube 22.

In this embodiment, the inflatable portion 25 works as a "webbing" to a light crash or the like, by which the gas generating means does not work. The inflatable portion 25 elongates little in the longitudinal direction because of the elongating characteristic of the knitted textile member 23. Therefore, the inflatable portion 25 can receive a tensile force of the belt as the webbing 10 so as to restrain the occupant properly.

The inflatable portion 25 is inflated in a proper shape as in the embodiment shown in FIG. 13 (a) and FIG. 13 (b) at a crash so as to restrain and ensure the occupant with the wider area of the inflatable portion 25.

We claim:

1. An inflatable seat belt apparatus for restraining movement of an occupant in a vehicle, comprising:

a webbing attached to the vehicle and extending for restraining movement of the occupant;

an inflatable portion having an elongated shape and being formed over at least a part of the webbing, said inflatable portion contacting the occupant when the webbing is worn and having an elastic inflatable tube;

a tongue fixed to the elastic inflatable tube and having a gas flow path therein;

a buckle attached to the vehicle and engagable to the tongue, said buckle including a gas path having one end engagable to the gas flow path of the tongue;

first gas generating means connected to the gas path of the buckle, said first gas generating means providing a gas to the elastic inflatable tube to fully inflate the elastic inflatable tube when the vehicle receives a predetermined deceleration;

second gas generating means attached to the gas path of the buckle, said second gas generating means providing a gas for a leak test to the elastic inflatable tube at a pressure less than that supplied by the first gas generating means when the tongue is engaged with the buckle; and gas leak detecting means disposed adjacent to the gas path of the buckle, said gas leak detecting means checking leakage of the gas in the elastic inflatable tube when the gas from the second gas generating means is supplied to the elastic inflatable tube so that the leakage of the elastic inflatable tube is inspected.

2. An inflatable seat belt apparatus according to claim 1, wherein said gas leak detecting means is a pressure sensor to detect change of the pressure in the elastic inflatable tube.

3. An inflatable seat belt apparatus according to claim 2, wherein said buckle further includes a valve attached to the gas path for switching connection of the gas path, said valve allowing the gas path to communicate the second gas generating means at the leak test and to communicate the first gas generating means after the leak test so that the elastic inflatable tube can be fully inflated by the first gas generating means when the vehicle receives the predetermined deceleration.

4. An inflatable seat belt apparatus according to claim 3, wherein said buckle further includes a gas exhaust pipe connected to the valve so that the gas in the elastic inflatable tube supplied from the second gas generating means is exhausted, after the leak test, from the gas exhaust pipe through the valve.

5. An inflatable seat belt apparatus according to claim 4, wherein said buckle further includes a tongue connection detecting sensor to detect connection between the tongue and the buckle.

6. An inflatable seat belt apparatus according to claim 3, further comprising controlling means connected to the gas leak detecting means, said controlling means preventing the first gas generating means from operating when the gas leak detecting means detects leakage of the elastic inflatable tube.

7. An inflatable seat belt apparatus according to claim 6, further comprising indicating means connected to the gas leak detecting means for indicating a detection result of the gas leak detecting means.

8. An inflatable seat belt apparatus according to claim 1, wherein said inflatable portion further includes a filter attached to the tongue and situated inside the elastic inflatable tube, and a knitted member in a flat form and connected to the webbing to cover the entire inflatable tube, said knitted member having an elasticity in a direction perpendicular to a longitudinal direction of the webbing.

9. An inflatable seat belt apparatus according to claim 8, wherein said inflatable portion further includes a [non-expandable] cover for covering the knitted member, said cover being sewn by first and second threads along the longitudinal direction of the webbing, said first threads being stronger than the second threads so that when the elastic inflatable tube is inflated, the second threads are torn to allow the elastic inflatable tube to inflate at a portion covered by the second threads.

*10. An inflatable occupant protection device comprising:*

*an elongated webbing;*

*an inflatable member;*

*a fabric member connected to the elongated webbing to cover the inflatable member;*

*a tongue fixed to the inflatable member and having a gas flow path therein;*

*a buckle engageable with the tongue and having a gas flow path engageable with the gas flow path of the tongue;*

*a gas source connected to the gas flow path of the buckle to supply gas for inflation of the inflatable member; and*

*a leak detection control unit connected to the gas flow path of the buckle, the leak detection control unit detecting gas leakage upon engagement of the buckle and tongue;*

*wherein the fabric member is expandable in a direction transverse to a longitudinal direction of the elongated webbing upon inflation of the inflatable member, thereby pretensioning the elongated webbing.*

*11. An inflatable occupant protection device according to claim 10, further comprising a filter attached to the tongue.*

*12. An inflatable occupant protection device according to claim 10, wherein the inflatable member is formed of a heat resisting material.*

*13. An inflatable occupant protection device according to claim 10, wherein the fabric member is a knitted fabric member that is easily expandable in the direction transverse to the longitudinal direction of the elongated webbing.*

*14. An inflatable occupant protection device according to claim 10, wherein the leak detection control unit detects gas leakage with a sensor that detects a change in pressure of the inflatable member while the tongue and the buckle are engaged.*

*15. A method for providing occupant protection comprising the steps of:*

*attaching an elongated webbing to a vehicle;*

*fixing to the elongated webbing an inflatable member, the inflatable member being covered by a fabric member which is connected to the elongated webbing, the fabric member pre-tensioning the elongated webbing upon inflation of the inflatable member by expanding in a direction transverse to a longitudinal direction of the elongated webbing;*

*fixing a tongue to the inflatable member, the tongue having a gas flow path therein;*

*providing a buckle engageable with the tongue and having a gas flow path engageable with the gas flow path of the tongue;*

*connecting a gas source to the gas flow path of the buckle to supply gas for inflation of the inflatable member; and*

*connecting a leak detection control unit to the gas flow path of the buckle, the leak detection control unit detecting gas leakage upon engagement of the buckle and tongue.*

*16. A method for providing occupant protection according to claim 15, further comprising the step of attaching a filter to the tongue.*

*17. A method for providing occupant protection according to claim 15, wherein the step of fixing to the elongated webbing an inflatable member comprises fixing to the elongated webbing an inflatable member formed of a heat resisting material.*

*18. A method for providing occupant protection according to claim 15, wherein the step of fixing to the elongated webbing an inflatable member comprises fixing to the elongated webbing an inflatable member that is covered by a knitted fabric member that is easily expandable in the direction transverse to the longitudinal direction of the elongated webbing.*

*19. A method for providing occupant protection according to claim 15, wherein the leak detection control unit includes a sensor, and the method further comprises the step of detecting gas with the sensor, thereby detecting a change in pressure of the inflatable member while the tongue and the buckle are engaged.*

* * * * *